United States Patent
Komerska

(10) Patent No.: US 6,651,292 B2
(45) Date of Patent: Nov. 25, 2003

(54) CANTILEVERED BEAM-BLADE WINDSHIELD-WIPER ASSEMBLY

(75) Inventor: Anthony J. Komerska, Troy, MI (US)

(73) Assignee: Trico Products Corporation, Rochester Hills, MI (US)

( * ) Notice: Subject to any disclaimer, the term of this patent is extended or adjusted under 35 U.S.C. 154(b) by 292 days.

(21) Appl. No.: 09/785,784

(22) Filed: Feb. 16, 2001

(65) Prior Publication Data

US 2002/0112306 A1 Aug. 22, 2002

(51) Int. Cl.[7] .............. B60S 1/40; B60S 1/32; B60S 1/38
(52) U.S. Cl. ............. 15/250.32; 15/250.351; 15/250.43
(58) Field of Search ............ 15/250.351, 250.352, 15/250.19, 250.32, 250.31, 250.21, 250.43, 250.361, 250.002

(56) References Cited

U.S. PATENT DOCUMENTS

| | | | |
|---|---|---|---|
| 2,550,094 A | * 4/1951 | Smulski | 15/250.23 |
| 2,589,339 A | 3/1952 | Carson | 15/245 |
| 2,801,436 A | 8/1957 | Scinta | 15/245 |
| 2,890,472 A | * 6/1959 | Olson | 15/250.23 |
| 3,029,460 A | 4/1962 | Hoyler | |
| 3,104,412 A | 9/1963 | Hinder | 15/250.42 |
| 3,132,367 A | 5/1964 | Wise | 15/250.42 |
| 3,192,551 A | 7/1965 | Appel | 15/250.36 |
| 3,480,986 A | 12/1969 | Forster | 15/250.36 |
| 3,588,942 A | 6/1971 | Schlesinger | 15/250.42 |
| 3,665,544 A | * 5/1972 | Sakamoto | 15/250.351 |
| 3,751,754 A | 8/1973 | Quinian et al. | 15/250.32 |
| 3,780,395 A | 12/1973 | Quinian et al. | 15/250.36 |
| 3,872,537 A | 3/1975 | Bianchi | 15/250.42 |
| 3,881,214 A | 5/1975 | Palu | 15/250.42 |
| 4,028,770 A | 6/1977 | Appel | 15/250.42 |
| 4,063,328 A | 12/1977 | Arman | 15/250.42 |
| 4,102,003 A | 7/1978 | Hancu | 15/250.42 |
| 4,127,916 A | 12/1978 | van der Berg et al. | 15/250.42 |
| 4,339,839 A | 7/1982 | Knights | 15/250.04 |
| 4,343,063 A | 8/1982 | Batt | 15/250.42 |
| 4,587,686 A | 5/1986 | Thompson | 15/250.42 |
| 4,807,326 A | 2/1989 | Arai et al. | 15/250.42 |
| 5,062,176 A | 11/1991 | Unterborn et al. | 15/250.23 |
| 5,307,536 A | 5/1994 | Lescher | 15/250.42 |
| 5,325,564 A | 7/1994 | Swanepoel | 15/250.42 |
| 5,485,650 A | 1/1996 | Swanepoel | 15/250.43 |

FOREIGN PATENT DOCUMENTS

| | | | |
|---|---|---|---|
| DE | 2 311 293 | 9/1974 | |
| DE | 23 36 271 | 2/1975 | |
| DE | 23 50 302 | 4/1975 | |
| DE | 23 53 368 | 5/1975 | |
| DE | 19650929 | * 6/1998 | 15/250.351 |
| DE | 197 34 843 A1 | 2/1999 | |
| DE | 198 14 609 A1 | 10/1999 | |
| FR | 82 14233 | 7/1982 | |
| GB | 1 012 902 | 12/1965 | |
| GB | 1 395 918 | 5/1975 | |
| GB | 2 308 542 A | 7/1997 | |

* cited by examiner

*Primary Examiner*—Gary K. Graham
(74) *Attorney, Agent, or Firm*—Bliss McGlynn, P.C.

(57) ABSTRACT

A cantilevered beam-blade windshield-wiper assembly includes a longitudinally extending backbone having first and second ends. A wiper element is mounted to and extends a substantial portion of the longitudinal extent of the backbone and is adapted for wiping engagement with a windshield. A wiper arm is connected to the first end of the backbone such that the backbone is supported in cantilevered fashion by the wiper arm at the first end and the second end is disposed distal the wiper arm. The wiper arm is adapted to be reciprocally driven with respect to the windshield, apply a biasing downward pressure to the backbone in the direction of the windshield, and move the backbone reciprocally across the windshield.

19 Claims, 7 Drawing Sheets

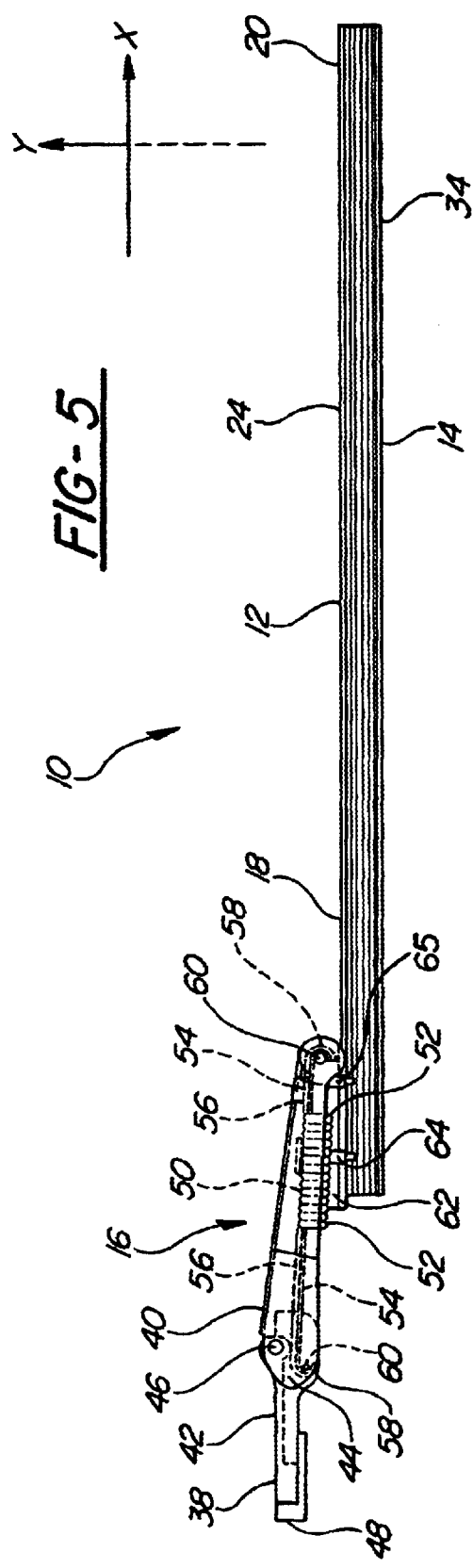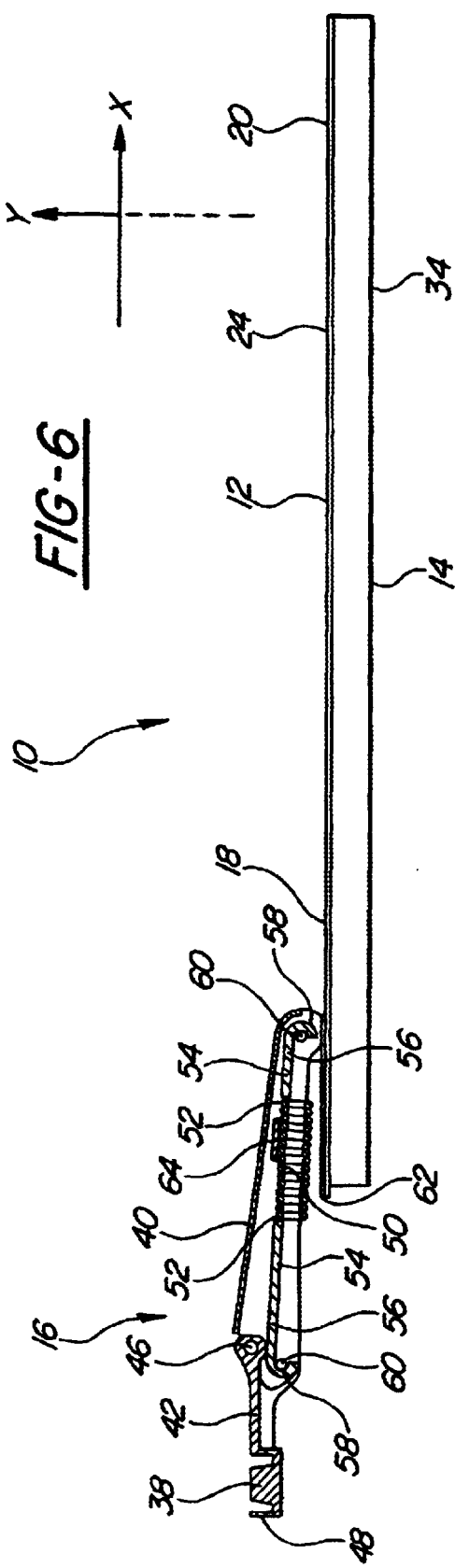

CANTILEVERED BEAM-BLADE WINDSHIELD-WIPER ASSEMBLY

BACKGROUND OF THE INVENTION

1. Field of the Invention

The present invention relates, generally, to windshield-wiper assemblies and, more specifically, to a beam-blade windshield-wiper assembly having an elongated backbone that is supported in cantilevered fashion.

2. Description of the Related Art

Conventional windshield-wiper assemblies known in the related art include some type of blade assembly mounted to a wiper arm that, in turn, is mounted adjacent a vehicular windshield and pivotally driven to impart reciprocating motion to the blade assembly across the windshield. A rubber wiper-element is supported by the blade assembly and contacts the windshield across the surface to be wiped. The wiper element often incorporates one or more metal strips that act to reinforce the wiper element and facilitate wiping contact by the wiper element across what is typically a glass surface.

One type of blade assembly commonly known in the related art employs a "tournament" style superstructure having a primary lever carried by the wiper arm, two secondary levers, and as many as four or more tertiary levers. Each secondary lever is articulated to the primary lever at a pivot point located at an opposed, lateral end of the primary lever. Similarly, each tertiary lever is articulated to a secondary lever at a pivot point located at an opposed, lateral end of its associated secondary lever. "Tournament" style blade assemblies often utilize steel vertebra that are mounted relative to the wiper element to provide a force distribution of the wiper element against the glass.

The blade assembly is located on an end of the wiper arm and represents a significant portion of the inertia generated by the windshield-wiper assembly in operation. Furthermore, the profile of the blade assembly as it reciprocates across the windshield is an important design consideration as it relates to avoiding wind-lift at higher vehicle speeds. In addition, since components of the windshield-wiper assembly are often visible, even when the windshield-wiper assembly is not in operation, the appearance of the components is also an important design consideration.

Beam-style blade assemblies are also known in the art. The beam-blade assembly includes a single, elongated, homogenous strip forming a backbone. The backbone has a formation at a central position of the backbone for connection to the pivotally driven wiper arm, which applies a downward force and moves the beam-blade assembly across the windshield. The backbone is usually curved along the same plane of curvature as that defined by the windshield. The wiper element is secured to the backbone. Examples of beam-blade assemblies can be found in U.S. Pat. Nos. 5,325,564 and 5,485,650 issued Jul. 5, 1994 and Jan. 23, 1996, respectively, both in the name of Swanepoel.

The backbone disclosed in the Swanepoel '564 and '650 patents is made from spring steel and preferably tapers in width from the center toward the free ends, or, tips, of the backbone. Swanepoel teaches that the thickness, width, and radius of curvature of the backbone should preferably be matched along the length of the backbone such that the backbone will provide a force-per-unit-length distribution that increases toward both tips of the backbone when the windshield-wiper assembly is in use. The backbone is pressed downwardly intermediate its tips onto the surface of the windshield. Beam-blade assemblies exhibit the advantages of having a lower profile, consisting of fewer parts, and being more pleasing in appearance as compared with "tournament" style blade assemblies.

While beam-blade assemblies have been proposed for use with windshields, they have not been proposed or generally adopted for use with rear vehicle windows. The wiper assemblies employed on rear windows are substantially of the tournament style. However, these assemblies result in a relatively long wiper arm and a profile that partially includes most of the wiper arm, approximately half of the backbone, and the space between them. Such assemblies commonly employed in the related art are not optimally thin and, thus, not optimally aesthetically pleasing.

Accordingly, there continues to be a need in the art for beam-blade windshield-wiper assemblies having a lower profile, simpler parts, and a more pleasing appearance.

SUMMARY OF THE INVENTION

The present invention overcomes the disadvantages in the related art by providing a cantilevered beam-blade windshield-wiper assembly. The assembly includes a longitudinally extending backbone having first and second ends. A wiper element is mounted to and extends a substantial portion of the longitudinal extent of the backbone and is adapted for wiping engagement with a windshield. A wiper arm is connected to the first end of the backbone such that the backbone is supported in cantilevered fashion by the wiper arm at the first end and the second end is disposed distal the wiper arm. The wiper arm is adapted to be reciprocally driven with respect to the windshield, apply a biasing downward pressure to the backbone in the direction of the windshield, and move the backbone reciprocally across the windshield.

One advantage of the cantilevered beam-blade windshield-wiper assembly of the present invention is that it is more compact and has a lower profile when compared to conventional tournament-style windshield-wiper assemblies known in the related art. More specifically, the beam-blade windshield-wiper assembly of the present invention provides a backbone connected at an end thereof to a wiper arm and extending away from the wiper arm. As a result, no substantial portion of the backbone shares a plane co-extensive with the wiper arm and perpendicular to the windshield. Still, the backbone is fully operative to reciprocate across a windshield in conjunction with a wiper element to wipe the surface of the windshield.

Another advantage of the cantilevered beam-blade windshield-wiper assembly of the present invention is that it has simpler parts while providing improved performance when compared to conventional tournament-style windshield-wiper assemblies known in the related art.

Another advantage of the cantilevered beam-blade windshield-wiper assembly of the present invention is that it is more pleasing in appearance when compared to conventional tournament-style windshield-wiper assemblies known in the related art.

Another advantage of the cantilevered beam-blade windshield-wiper assembly of the present invention is that because it has generally fewer parts, it costs less to manufacture when compared to conventional tournament-style windshield-wiper assemblies known in the related art.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a cross-sectional side view of a preferred embodiment of the cantilevered beam-blade windshield-wiper assembly of the present invention;

FIG. 6 is a cross-sectional side view of the preferred embodiment of the cantilevered beam-blade windshield-wiper assembly of the present invention shown in FIG. 5 and better illustrating the biasing member of the assembly;

DETAILED DESCRIPTION OF THE PREFERRED EMBODIMENT(S)

Figure 1:
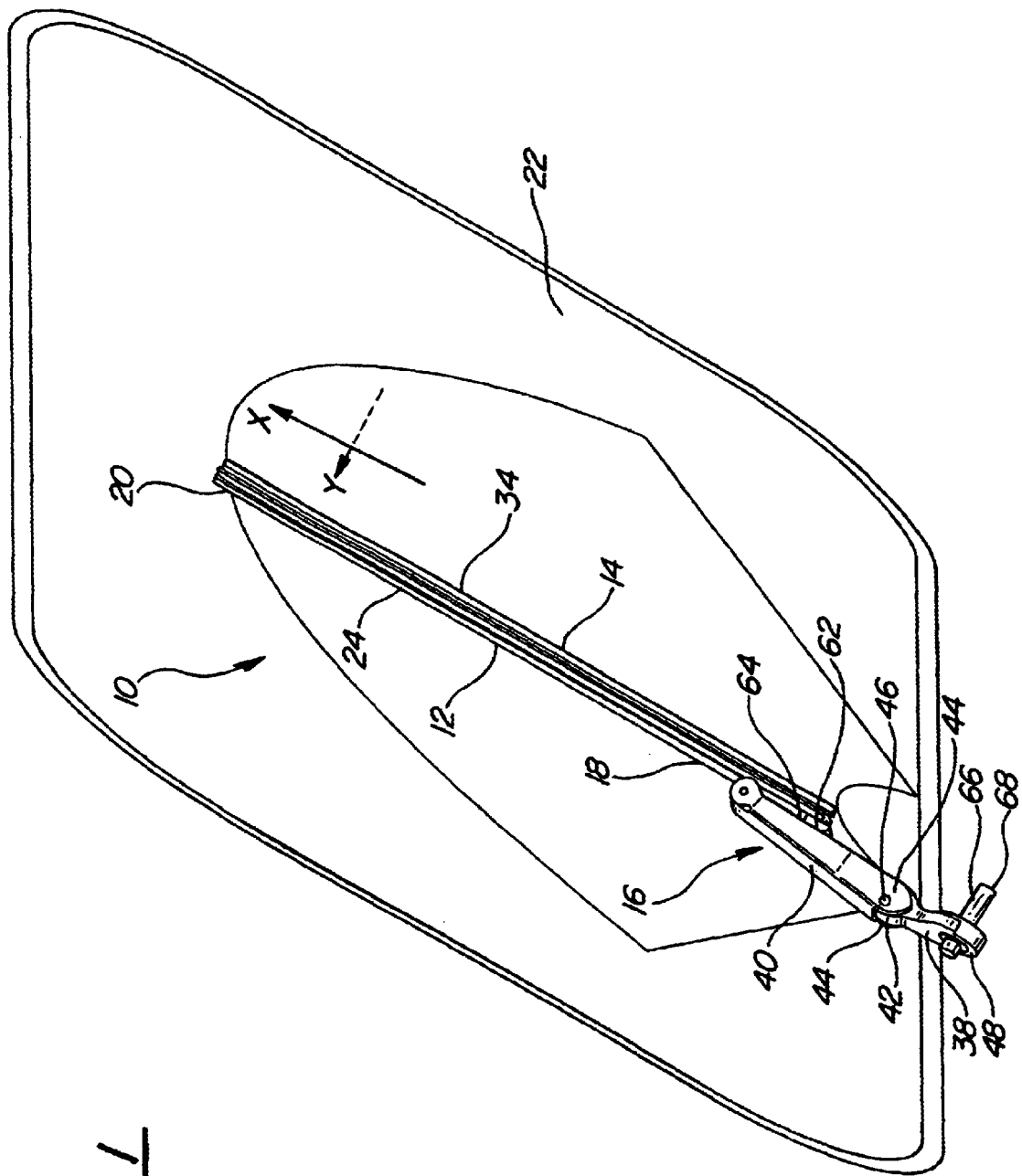
FIG. 1 is a partial plan view illustrating the cantilevered beam-blade windshield-wiper assembly of the present invention mounted in one orientation relative to an arcuate surface of a rear window of an automotive vehicle.
Figure 2:
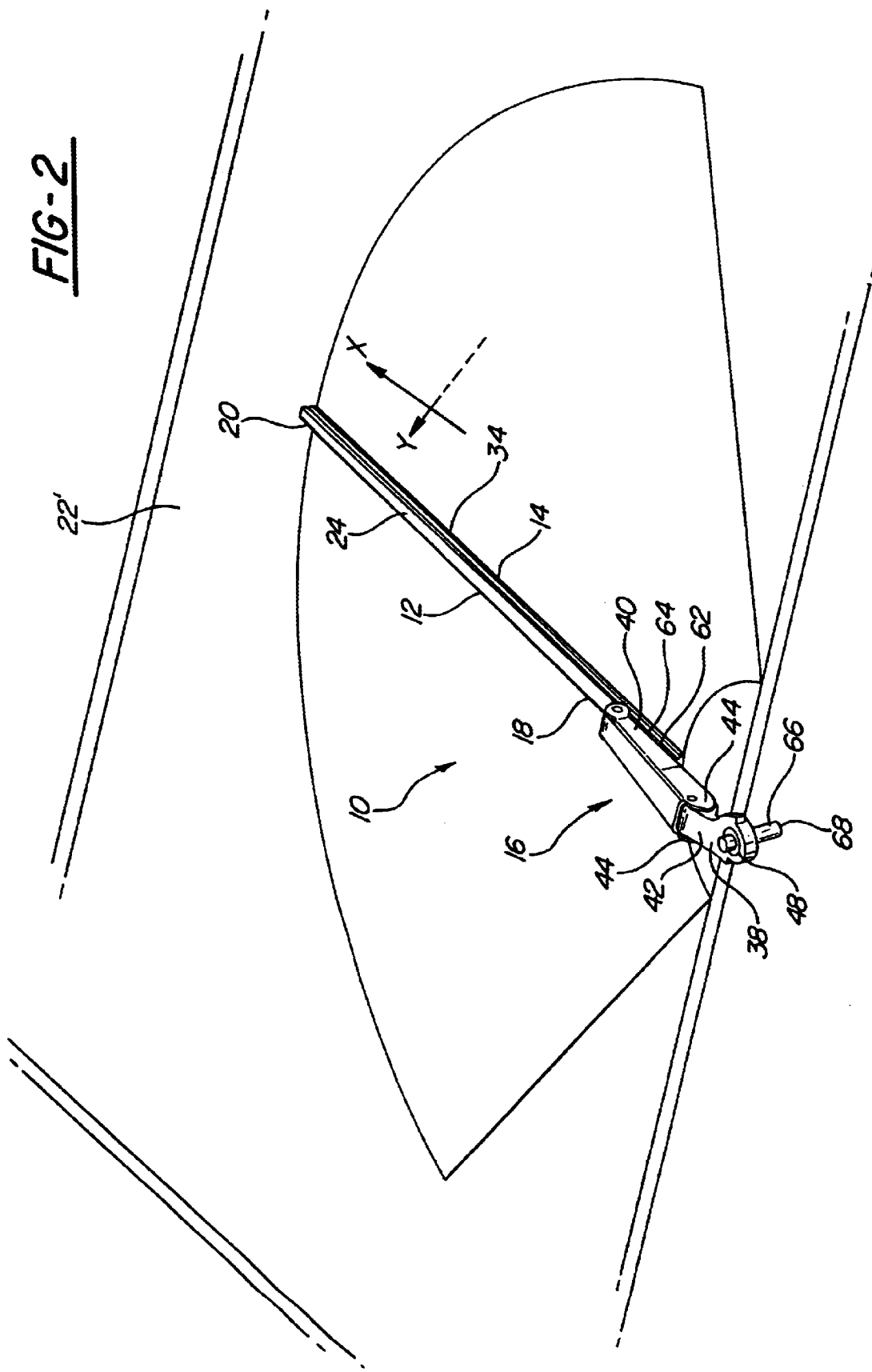
FIG. 2 is another partial plan view illustrating the cantilevered beam-blade windshield-wiper assembly of the present invention mounted in another representative orientation relative to a rear window of an automotive vehicle.

Referring now to FIGS. 1 through 8, where like numbers are used to designate like structure throughout the drawings, a cantilevered beam-blade windshield-wiper assembly (wiper assembly) of the present invention is generally indicated at 10. FIGS. 1 and 2 show the wiper assembly 10 used in connection with wiping a surface—for example, the backlight, or, the glass rear window 22, 22', of an automotive vehicle. As can be easily seen, the window 22 in FIG. 1 extends more vertically than horizontally and may have a slightly arcuate surface while the window 22' in FIG. 2 extends more horizontally than vertically. However, it is to be understood that the wiper assembly 10 may be used in connection with wiping a surface of any shape, size, radius of curvature, or texture. The size and shape of the components of the wiper assembly 10 and the material of which the components are made can be altered so as to correspond to the shape, size, radius of curvature, or texture of a given surface to be wiped. In FIGS. 1 and 2, the wiper assembly 10 is shown mounted in two different orientations adjacent the window 22, 22'. In either case, the wiper assembly 10 is operative to be reciprocally driven so as to wipe the window 22, 22' free of water, snow, ice, dust, dirt, and the like, as commonly known in the art.

Figure 4:
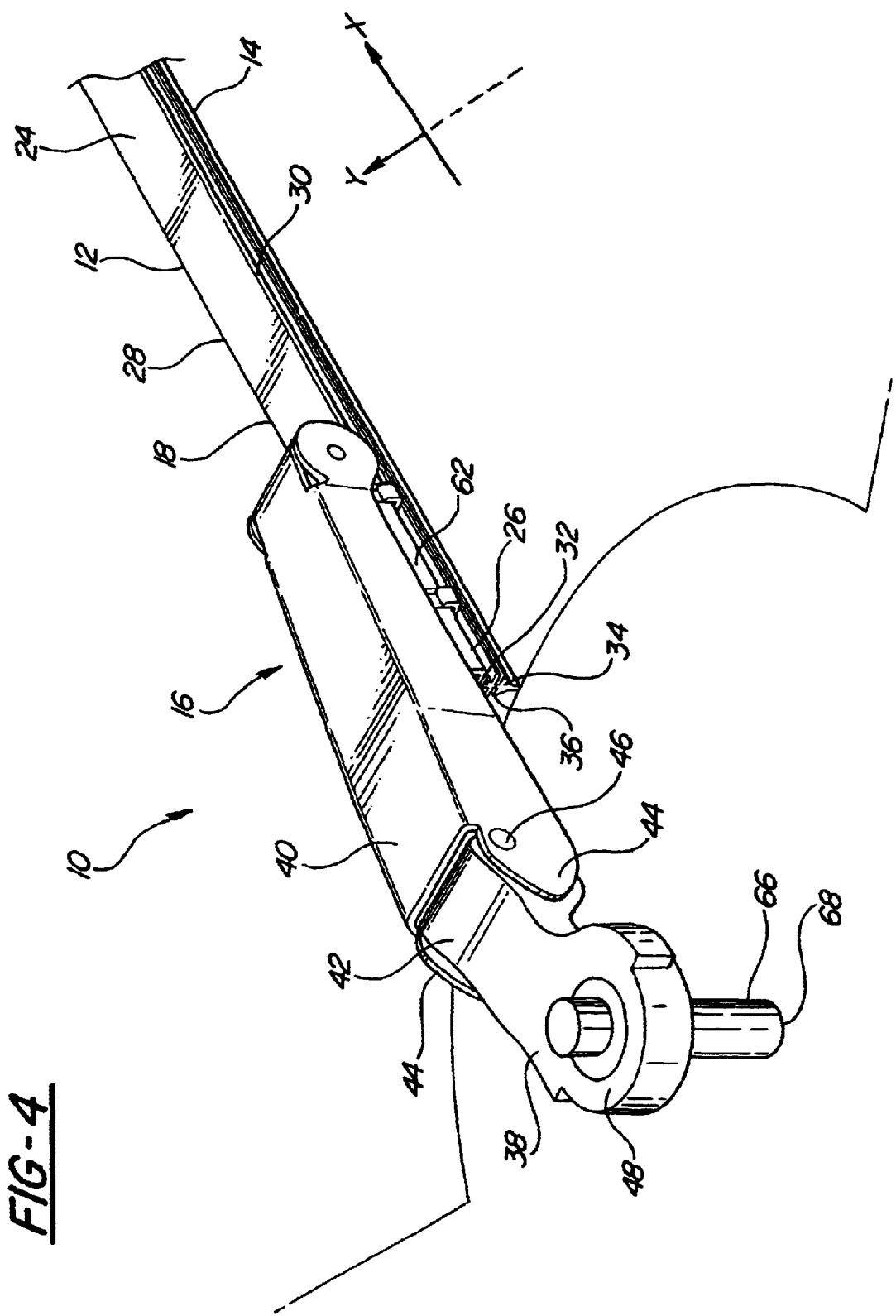
FIG. 4 is an enlarged perspective view of the preferred embodiment of the cantilevered beam-blade windshield-wiper assembly of the present invention shown in FIG. 2.
Figure 7:
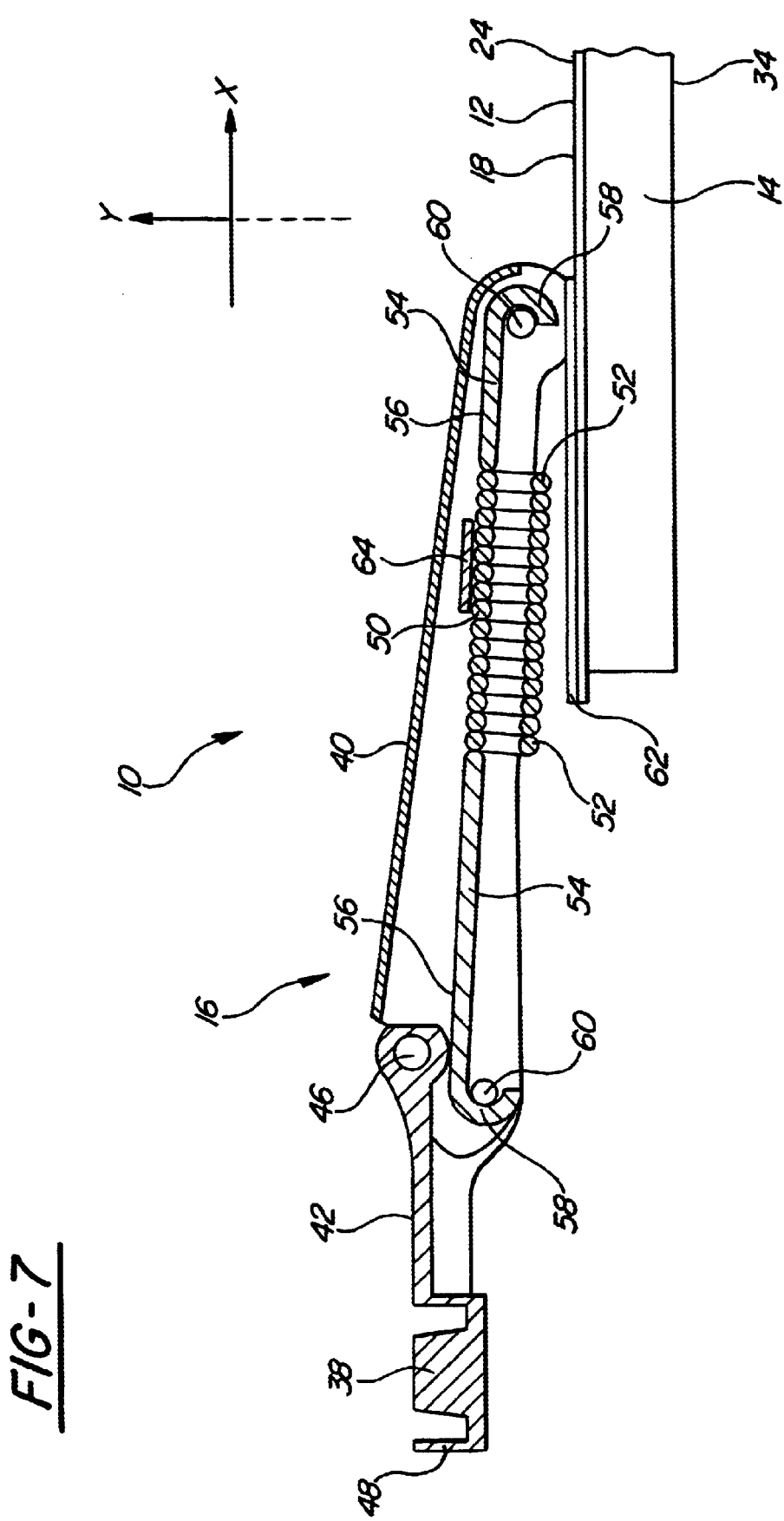
FIG. 7 is an enlarged view of the preferred embodiment of the cantilevered beam-blade windshield-wiper assembly of the present invention shown in FIG. 6.

To this end and as shown in the figures, the wiper assembly 10 includes a backbone 12, a wiper element 14, and a wiper arm, generally indicated at 16. The backbone 12 extends longitudinally and has first and second ends 18, 20. As best shown in FIG. 4, the preferred backbone 12 includes an upper surface 24 and an opposed mounting surface 26 that extend between the first and second ends 18, 20. The backbone 12 further includes first and second sides 28, 30 that also extend between the first and second ends 18, 20 transversely to the upper and mounting surfaces 24, 26. Thus, the backbone 12 has a generally rectangular cross-section. However, those having ordinary skill in the art will appreciate that the cross-section may have any suitable geometric shape.

The distance between the upper and mounting surfaces 24, 26 defines a thickness of the backbone 12, and the distance between the first and second sides 28, 30 defines a width of the backbone 12. Those having ordinary skill in the art will appreciate that the width can be constant or vary between the first and second ends 18, 20. For example, the width can be tapered in decreasing fashion from the first end 18 to the second end 20. Likewise, the thickness of the backbone 12 can be constant or vary between the first and second ends 18, 20.

Furthermore, the backbone 12 defines an x-axis displaced between the first and second ends 18, 20 and a y-axis extending transversely to the x-axis through the upper and mounting surfaces 24, 26 so as to define an x-y plane. As shown throughout the figures, the backbone 12 is substantially straight so as to coincide with the x-axis. However, those having ordinary skill in the art will appreciate that the backbone 12 can be curved in the x-y plane with a predetermined radius of curvature, sometimes referred to in the related art as a "free form" radius of curvature, parallel to the plane of curvature of the window 22. The curvature of the backbone 12 in the x-y plane may be symmetrical or asymmetrical, depending upon force requirements and the contour of the window 22. As described in detail below, the pre-curved backbone 12 straightens out when the wiper arm 16 applies a force to the backbone 12 to flatten the backbone 12 on the window 22. Thus, the backbone 12 must have adequate flexibility to ensure a good force distribution on windows 22 having various curvatures and effect proper wrapping about the windows 22. To this end, the disclosure of U.S. Pat. Nos. 5,325,564 and 5,485,650 issued to Swanepoel are incorporated herein by reference.

In addition, the backbone 12 must have high lateral stiffness to avoid chatter caused by lateral deflection of the wiper element 14 on the window 22. Lateral stiffness is provided mainly by the width of the backbone 12. Also, the backbone 12 must have high torsional stiffness to avoid chatter due to torsional deflection. The torsional stiffness is provided mainly by the thickness of the backbone 12. Accordingly, the backbone 12 is typically resiliently flexible and made of a single, integral piece of material such that the backbone 12 defines a consolidated cross-section. Alternatively, the backbone 12 may be formed into a single piece by laminates.

The wiper element 14 is mounted to and extends a substantial portion of the longitudinal extent of the backbone 12 and is adapted for wiping engagement with the window 22. Specifically, the wiper element 14 is mounted to the mounting surface 26 of the backbone 12. This mounting may be accomplished in a number of different ways, such as by mechanical-mounting mechanisms, chemical-mounting mechanisms, like adhesives, or any other suitable mechanism known in the related art.

As also best shown in FIG. 4, the preferred wiper element 14 has a spine member 32, a tip member 34, and a hinge member 36 that interconnects the spine member 32 and the tip member 34. The spine, tip, and hinge members 32, 34, 36 extend the entire length of the wiper element 14. The tip member 34 has a "delta" shape in cross-section and is the working end of the wiper element 14, which is operable for wiping action against the glass surface of the window 22. The hinge member 36 allows the tip member 34 to pivot slightly with respect to the glass surface of the window 22, thereby improving wipe quality.

Throughout the figures, the wiper element 14 is mounted to and extends for the entire length of the mounting surface 26. However, it will be appreciated by those having ordinary skill in the art that the wiper element 14 can be mounted to the mounting surface 26 and extend along the mounting surface 26 for any length of the mounting surface 26. Furthermore, while the wiper element 14 illustrated in the figures has a spine member 32, a delta-shaped tip member 34, and a hinge member 36, those having ordinary skill in the art will also appreciate that the components of the wiper element 14 may differ from those disclosed in the figures without departing from the scope of the invention. The wiper element 14 is preferably made of rubber or any other material suitable for wiping action across a glass surface.

The wiper arm 16 is connected to the backbone 12 and adapted to be reciprocally driven with respect to the window 22, apply a biasing downward pressure to the backbone 12 in the direction of the window 22, and move the backbone 12 reciprocally across the window 22. Importantly and particularly, the wiper arm 16 is connected to the first end 18 of the backbone 12 such that the backbone 12 is supported in cantilevered fashion by the wiper arm 16 at the first end 18. The second end 20 of the backbone 12 is disposed distal the wiper arm 16. In this manner, the backbone 12 is held by the wiper arm 16 at an end portion of the backbone 12, as opposed to a middle portion of the backbone 12, which is typical of beam-blade windshield-wiper assemblies of the related art. As a result, a shorter wiper arm 16 and a more compact and lower profile windshield-wiper assembly are provided.

Figure 3:
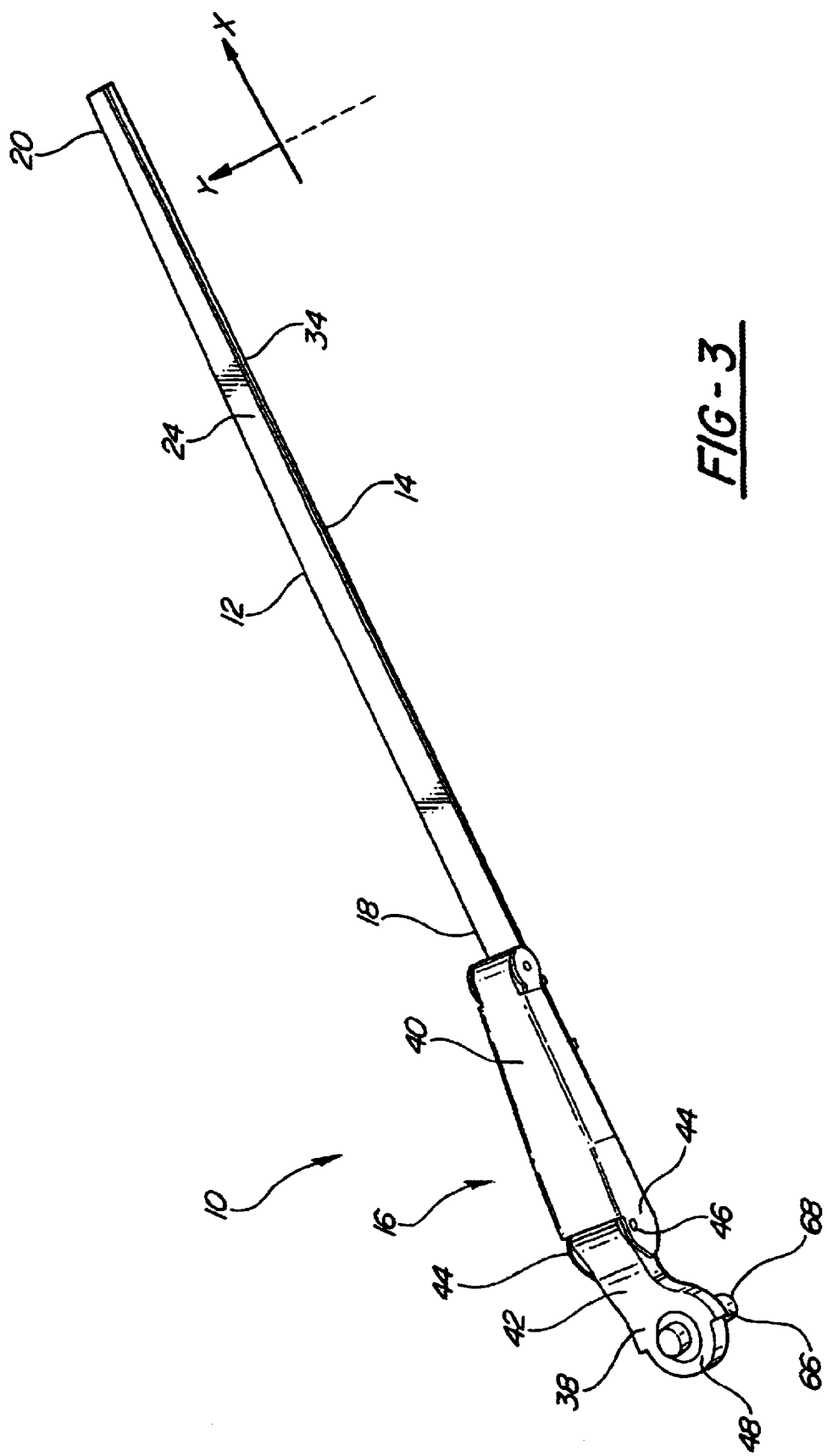
FIG. 3 is a perspective view of a preferred embodiment of the cantilevered beam-blade windshield-wiper assembly of the present invention.

As best shown in FIG. 3, the preferred wiper arm 16 includes a hub 38 and a longitudinally extending front portion 40 having a substantially inverted, U-shaped cross-section. The front portion 40 is supported by the hub 38 in an articulated fashion so as to permit the wiper arm 16 to apply the biasing downward pressure to the backbone 12, as will be described in greater detail below. The hub 38 has a substantially constant thickness and includes a rectangular portion 42 and a substantially arcuate portion 48 integrally extending from the substantially rectangular portion 42 distal the front portion 40. The width and thickness of the front portion 40 taper away from the hub 38 toward the first end 18 of the backbone 12.

In the preferred embodiment, the wiper assembly 10 further includes a drive mechanism 66 interconnecting a power source such as an electric motor (not shown) and the hub 38 of the wiper arm 16 and adapted to translate power from the motor into pivotal motion of the wiper arm 16. Specifically, the hub 38 is disposed between the drive mechanism 66 and the front portion 40 of the wiper arm 16. The drive mechanism 66 defines an axis of rotation 68 substantially perpendicular to the wiper arm 16 and about which the wiper arm 16 pivots, thereby imparting reciprocating movement to the backbone 12. The wiper arm 16 supports the backbone 12 such that the first end 18 of the backbone 12 is disposed generally in juxtaposed relation to the axis of rotation of the fixed point 68. Thus, the hub 38 is pivotal about an axis of rotation extending substantially perpendicularly to the longitudinal extent of the backbone 12 so as to impart reciprocal movement to the backbone 12.

The front portion 40 is pivotally supported relative to the hub 38 toward and away from the window 22 about an axis perpendicular to the axis of rotation 68 of the drive mechanism 66 and therefore also the hub 38. Specifically, the substantially rectangular portion 42 of the hub 38 is disposed between a pair of ears 44 of the front portion 40. The front portion 40 is pivotally connected at fixed points 46 (only one shown) substantially transverse to the longitudinal extent of the wiper arm 16 by any suitable method known in the related art that permits the front portion 40 to rotate about an axis defined by a line connecting the fixed points 46.

The front portion 40 also includes a biasing member 50, such as the coiled spring 50 shown in FIGS. 5 through 8, adapted to apply the biasing downward pressure to the backbone 12. The longitudinally extending spring 50 is disposed substantially horizontally within the boundaries defined by the inverted, U-shaped, front portion 40 such that a substantial portion of the spring 50 is spaced vertically adjacent a portion of the backbone 12. Each end 52 of the spring 50 terminates in a hook portion 54. Each hook portion 54 extends horizontally for a predetermined length so as to define a straight portion 56 and a hook 58. The hooks 58 are disposed about tabs 60 located at opposed longitudinal ends—at the rectangular portion 42 of the hub 38, on one hand, and within the front portion 40, on the other, so as to support the spring 50 in a stretched state.

In a preferred embodiment, the wiper assembly 10 further includes a coupler 62 connecting the wiper arm 16 to the first end 18 of the backbone 12 and adapted to impart pressure to the wiper arm 16. The wiper arm 16 transfers such pressure to the backbone 12 in the direction of the window 22, thereby changing the shape of the backbone 12 and adjusting the load of the wiper element 14 against the window 22. The coupler 62 includes a fastening member 64 adapted to provide a pre-determined component of force to the wiper arm 16 in the direction of the window 22.

In a preferred embodiment and as shown in FIGS. 5 through 8, the fastening member 64 is a saddle clip disposed within the front portion 40 in contacting relationship with the spring 50. The attitude of the saddle clip and, thus, the angle of attack of the backbone 12 relative to the window 22 are fixed. Saddle clips having relatively smaller radii can increase such attitude and angle while saddle clips having relatively larger radii can decrease such attitude and angle. Accordingly, varying magnitudes of force can be provided to the backbone 12 in the direction of the window 22.

Figure 8:
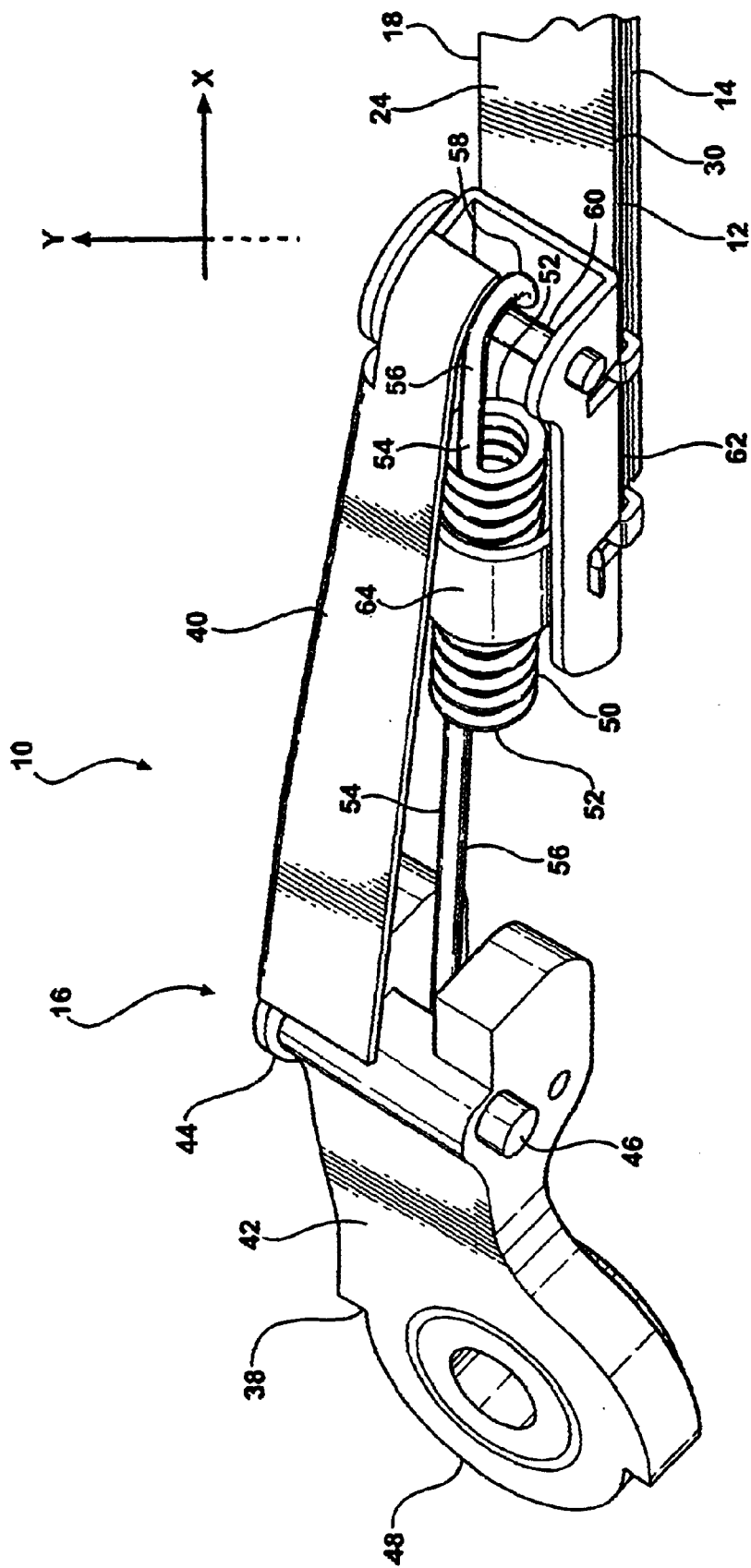
FIG. 8 is a partial perspective view of a preferred embodiment of the cantilevered beam-blade windshield-wiper assembly of the present invention with the front portion of the wiper arm cut away to show the disposition of the saddle clip in relation to the front portion, the spring, and the backbone.

More specifically and as best shown in FIG. 8, the saddle clip is mounted partially about a central portion of the spring 50. Those having ordinary skill in the art will appreciate that the saddle clip may be located at any position along the spring 50 and can be of any suitable design. Each longitudinal end of the saddle clip is releasably connected to a corresponding side of the front portion 40. The saddle clip applies a predetermined pressure, or component of force, to the spring 50, which, in turn, transfers such pressure to the wiper arm 16 in the direction of the window 22. The wiper arm 16 transfers such pressure to the backbone 12 in the direction of the window 22, thereby changing the shape of the backbone 12 and adjusting the load of the wiper element 14 against the window 22.

Alternatively, an adjustment screw 65 (designated in FIG. 5) may be substituted for the fastening member 64. The adjustment screw 65 is disposed within the front portion 40 in contacting relationship with the spring 50. By adjusting the attitude of the adjustment screw 65, the angle of attack of the backbone 12 relative to the window 22 is either increased or decreased, thereby providing varying magnitudes of force to the backbone 12 in the direction of the window 22. The adjustment screw 65 releasably connects the wiper arm 16 to the backbone 12 and can be of any suitable design. Those having ordinary skill in the art will appreciate that the adjustment screw may be located at any position between the first and second sides 28,30 of the backbone 12.

Although the fastening member 64 of a preferred embodiment of the wiper assembly 10 includes a saddle clip or an adjustment screw, those having ordinarily skill in the art will appreciate that the fastening member 64 may include any structure adapted to provide a pre-determined component of force to the wiper arm 16 in the direction of the window 22. Like the adjustment screw and the use of various sizes of the saddle clip, such structure may also be adapted to provide varying magnitudes of force to the backbone 12 in the direction of the window 22.

In operation, the power source transmits power to the drive mechanism 66, which translates such power into reciprocating motion of the hub 38 and front portion 40 of the wiper arm 16. Meanwhile, the spring 50, extending between the hub 38 and the front portion 40, applies a force on the front portion 40 that is distributed to and along the length of the backbone 12 through the coupler 62 to the first and second ends 18, 20 of the backbone 12. This results in a bias in the general direction of the window 22 so as to press the wiper element 14 against the window 22 with a predetermined force as the wiper assembly 10 is moved reciprocally across the window 22 to clean the window 22.

Thus, the present invention provides a cantilevered beam-blade windshield-wiper assembly 10 that is more compact, has a lower profile, and, thus, enjoys improved wind-lift characteristics when compared to conventional tournament-style windshield-wiper assemblies known in the related art. More specifically, the wiper assembly 10 provides a backbone 12 connected at an end 18 of the backbone 12 to a wiper arm 16 and extending away from the wiper arm 16. As a result, no substantial portion of the backbone 12 shares a plane co-extensive with the wiper arm 16 and perpendicular to the window 22. Still, the backbone 12 is fully operative to reciprocate across a window 22 in conjunction with a wiper element 14 to clean the surface of the window 22. Furthermore, the wiper assembly 10 has simpler parts and is more pleasing in appearance while providing improved performance when compared to conventional tournament-style windshield-wiper assemblies known in the related art. Finally, because the wiper arm 16 is substantially shorter, the cost to manufacture the wiper assembly 10 is less than tournament-style windshield-wiper assemblies known in the related art.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

I claim:

1. A cantilevered beam-blade windshield-wiper assembly comprising:

a longitudinally extending backbone having first and second ends;

a wiper element mounted to and extending a substantial portion of the longitudinal extent of said backbone and adapted for wiping engagement with a windshield; and a wiper arm and a coupler connecting said wiper arm to said first end of said backbone such that said backbone is supported in cantilevered fashion by said wiper arm at said first end and said second end is disposed distal said wiper arm, said coupler including a fastener member having a saddle clip adapted to provide a force on said backbone and an adjustable load on said wiper element against the windshield, said wiper arm adapted to be reciprocally driven so as to move said wiper element reciprocally across the windshield.

2. A cantilevered beam-blade windshield-wiper assembly as set forth in claim 1, wherein said wiper arm includes a hub and a front portion supported by said hub in an articulated fashion so as to permit said wiper arm to apply the biasing downward pressure to said backbone.

3. A cantilevered beam-blade windshield-wiper assembly as set forth in claim 2, wherein said front portion of said wiper arm tapers away from said hub toward said first end of said backbone.

4. A cantilevered beam-blade windshield-wiper assembly as set forth in claim 2, wherein said front portion includes a biasing member adapted to apply the biasing downward pressure to said backbone.

5. A cantilevered beam-blade windshield-wiper assembly as set forth in claim 4, wherein said biasing member includes a spring.

6. A cantilevered beam-blade windshield-wiper assembly as set forth in claim 2, wherein said assembly further includes a drive mechanism interconnecting a power source and said wiper arm and adapted to translate power from said power source into pivotal motion of said wiper arm.

7. A cantilevered beam-blade windshield-wiper assembly as set forth in claim 6, wherein said hub is disposed between said drive mechanism and said front portion of said wiper arm, said hub being pivotal about an axis of rotation extending substantially perpendicular to the longitudinal extent of said backbone so as to impart reciprocal movement thereto.

8. A cantilevered beam-blade windshield-wiper assembly as set forth in claim 7, wherein said front portion is pivotally supported relative to said hub toward and away from the windshield about an axis perpendicular to the axis of rotation of said hub.

9. A cantilevered beam-blade windshield-wiper assembly as set forth in claim 8, wherein a biasing member extends between said hub and said front portion, said biasing member applying a force on said front portion that results in a bias in the general direction of the windshield so as to press said wiper element against the windshield with a predetermined force as said windshield wiper assembly is moved reciprocally across the windshield.

10. A cantilevered beam-blade windshield-wiper assembly as set forth in claim 7, wherein said backbone is supported by said wiper arm such that said first end of said backbone is disposed generally in juxtaposed relation to the axis of rotation of said fixed point.

11. A cantilevered beam-blade windshield-wiper assembly as set forth in claim 6, wherein said drive mechanism interconnects the power source and the hub of said wiper arm and defines a fixed point having an axis of rotation substantially perpendicular to said wiper arm and about which said wiper arm pivots, thereby imparting reciprocating movement to said backbone.

12. A cantilevered beam-blade windshield-wiper assembly as set forth in claim 1, wherein said fastening mechanism includes an adjustment screw adapted to provide a fixed magnitude of force to said backbone in the direction of the windshield.

13. A cantilevered beam-blade windshield-wiper assembly as set forth in claim 1, wherein said backbone further includes an upper surface and an opposed mounting surface that extend between said first and second ends and first and second sides that extend between said first and second ends transversely to said upper and mounting surfaces, the distance between said upper and mounting surfaces defining a thickness of said backbone and the distance between said first and second sides defining a width of said backbone.

14. A cantilevered beam-blade windshield-wiper assembly as set forth in claim 13, wherein said wiper element is mounted to and extends for a substantial portion along said mounting surface.

15. A cantilevered beam-blade windshield-wiper assembly as set forth in claim 13, wherein said backbone defines an x-axis displaced between said first and second ends and a y-axis extending transversely to said x-axis and through said upper and mounting surfaces so as to define an x-y plane.

16. A cantilevered beam-blade windshield-wiper assembly as set forth in claim 13, wherein said width of said backbone varies and said thickness of said backbone is substantially constant between said first and second ends of said backbone.

17. A cantilevered beam-blade windshield-wiper assembly as set forth in claim 13, wherein said width of said backbone is tapered in decreasing fashion from said first end of said backbone to said second end of said backbone.

18. A cantilevered beam-blade windshield-wiper assembly as set forth in claim 1, wherein said backbone is substantially straight.

19. A cantilevered beam-blade windshield-wiper assembly as set forth in claim 1, wherein said wiper element comprises a spine member, a tip member, and a hinge member that connects said spine member and said tip member, said backbone being connected to said spine member.

* * * * *